E. F. VAN HOUTEN.
Adjustable Pullies for Gas-Machines, &c.

No. 141,967. Patented August 19, 1873.

Witnesses.
Oliver Drake.
David Collins.

Inventor
Edwin F. Van Houten
By Drake & Co. Att's.

UNITED STATES PATENT OFFICE.

EDWIN F. VAN HOUTEN, OF NEWARK, NEW JERSEY, ASSIGNOR OF ONE-HALF HIS RIGHT TO SAMUEL T. TATE, OF BROOKLYN, NEW YORK.

IMPROVEMENT IN ADJUSTABLE PULLEYS FOR GAS-MACHINES, &c.

Specification forming part of Letters Patent No. 141,967, dated August 19, 1873; application filed March 26, 1873.

*To all whom it may concern:*

Be it known that I, EDWIN F. VAN HOUTEN, of the city of Newark, county of Essex and State of New Jersey, have invented certain Improvements in Adjustable Pulleys to be applied to Gas-Machines, and for other purposes; and I do declare the following to be a full, clear, and exact description of the same, reference being had to the accompanying drawings forming part of this specification.

Figure 1:
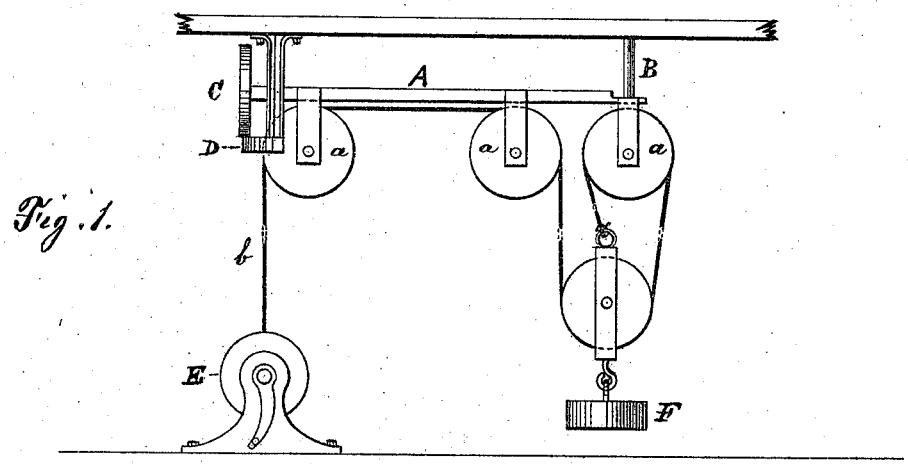
Figure 2:
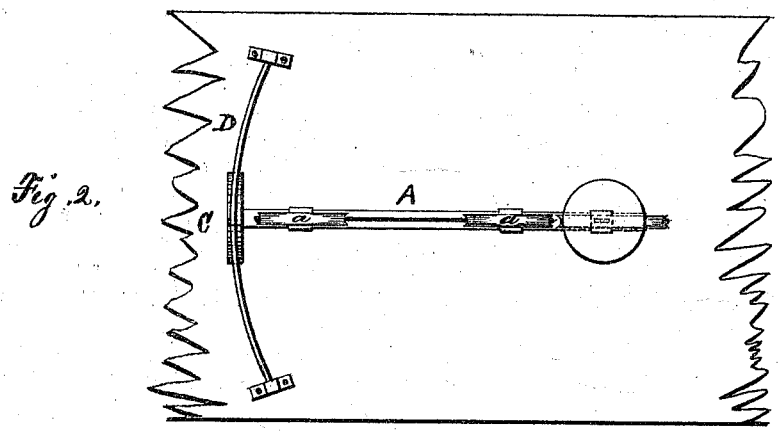
Figure 3:
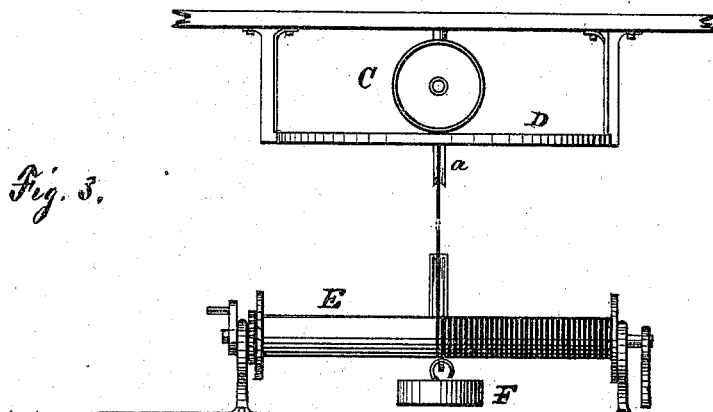

Figure 1 is a view of my invention, looking at the spool from the end. Fig. 2 is a top view of the same. Fig. 3 is a view, looking at the spool from the front.

The object of this invention is to overcome a difficulty which has long been experienced in relation to gas-machines, viz., to maintain the perpendicular position of the cord $b$ in relation to the spool E at all points on said spool, thereby preventing a great deal of friction and wear and tear, and securing a steadier light.

This invention consists of a bar, A, to which the pulleys $a\ a$ are attached. One end of said bar is pivoted to a beam, B, and the other end is supplied with a roller or wheel, C, which travels upon a curved bar, D, the length of said curved bar D being proportioned to the length of the spool E, the several pulleys, cord, weights, &c., being arranged substantially as shown, or otherwise, as may be desired.

Heretofore the pulleys have been secured to stationary beams, and, as a matter of course, the cord $b$ leading from the spool E to the pulley $a$ could not be in a perpendicular position, except at one point. When past that point on the spool either way the cord will be angling, and, as a consequence, will wear out a great deal faster and greatly increase the friction, the result of which is that the lights are affected, and burn more or less unsteadily, and, at times, may go entirely out. This difficulty is effectually overcome by my invention, as the cord maintains (as before stated) a perpendicular position at all points of the spool, and unwinds just as freely at one point as at another.

A glance at the drawing will clearly show the construction and operation of my invention without further description.

What I claim as new, and desire to secure by Letters Patent, is—

In combination with the spool E of a gas or other machine, the adjustable bar A, provided with the wheel C and pulleys $a\ a$, when operating substantially as and for the purposes herein set forth.

EDWIN F. VAN HOUTEN.

Witnesses:
OLIVER DRAKE,
DAVID COLLINS.